United States Patent [19]

Habib

[11] 4,252,464
[45] Feb. 24, 1981

[54] DEVICE FOR LIMITING STRESSES IN PARTICULAR FOR BURIED TUBULAR STRUCTURES

[75] Inventor: Pierre Habib, Paris, France

[73] Assignee: Davum, Villeneuve la Garenne, France

[21] Appl. No.: 39,480

[22] Filed: May 16, 1979

[30] Foreign Application Priority Data

May 19, 1978 [FR] France .................. 78 14856

[51] Int. Cl.³ .................................. E21D 11/22
[52] U.S. Cl. .............................. 405/153; 403/2; 405/124
[58] Field of Search ............... 405/124, 126, 150, 151, 405/153, 288; 52/98; 285/2, 3, 4; 403/2

[56] References Cited

U.S. PATENT DOCUMENTS

| | | | |
|---|---|---|---|
| 3,318,099 | 5/1967 | Sugden | 405/153 |
| 3,413,813 | 12/1968 | Rock et al. | 405/153 |
| 3,638,434 | 2/1972 | Delaere | 405/126 |
| 4,018,054 | 4/1977 | Standley | 405/150 |
| 4,126,403 | 11/1978 | Sweeney et al. | 403/2 |

FOREIGN PATENT DOCUMENTS

1003673  3/1957  Fed. Rep. of Germany ........... 405/153

*Primary Examiner*—David H. Corbin

*Attorney, Agent, or Firm*—Sughrue, Rothwell, Mion, Zinn and Macpeak

[57] ABSTRACT

A device for limiting stresses exerted by neighboring ground on a buried structure which comprises at least two Neighbouring elements which form at least one part of the wall of the structure. The stress limiting device comprises at least one longitudinal slidable plate adapted to be connected by one of its edge portions to one of the Neighbouring structure elements, at least two longitudinal guide elements adapted to be connected to the other structure element and applied respectively by one of their faces against at least the opposed edge portion of the slidable plate. A plurality of fixing means extend through apertures in the slidable plate and in the guide elements for clamping the opposed edge portion of the slidable plate between said guide elements. At least one of the guide elements constitutes a fishplate. At least the apertures in the opposed edge portion of the slidable plate are disposed in a plurality of spaced-apart longitudinal rows so that the zones located between the apertures of the same row of two adjacent rows form zones of deformation and/or fracture capable of yielding under the fixing means by a sliding of the slidable plate between the guide elements under the effect of forces which may be exerted on the device by the structure elements.

14 Claims, 13 Drawing Figures

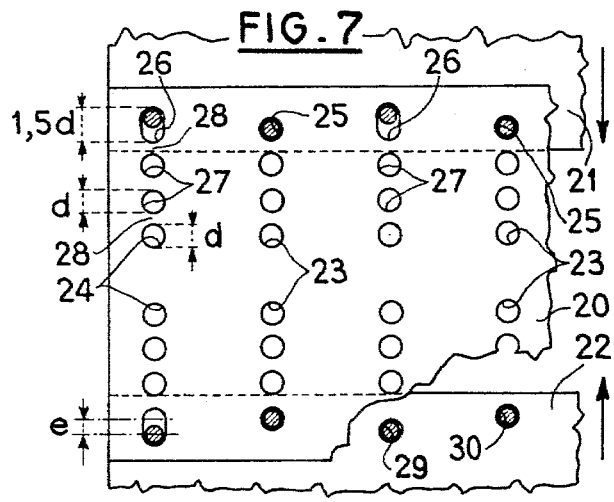
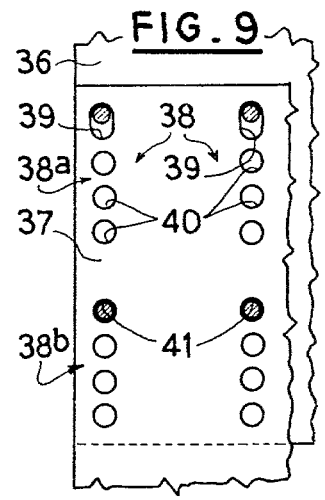
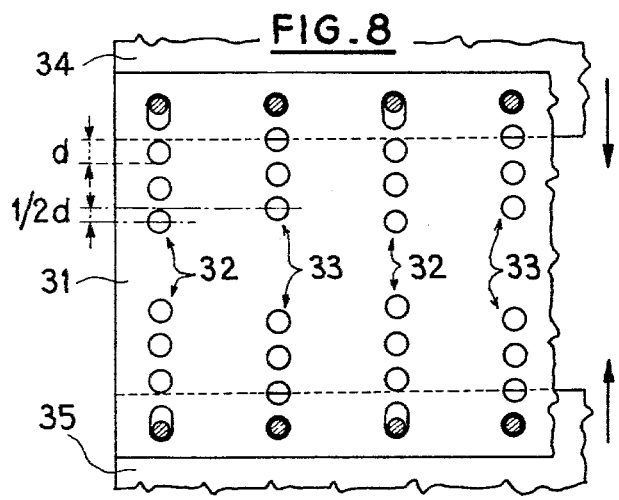
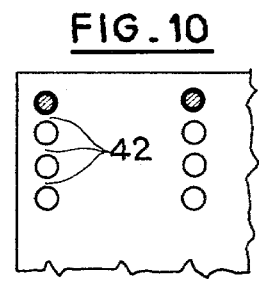
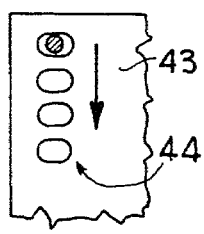
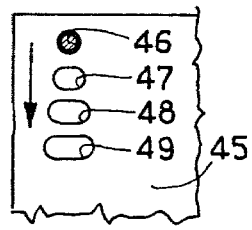
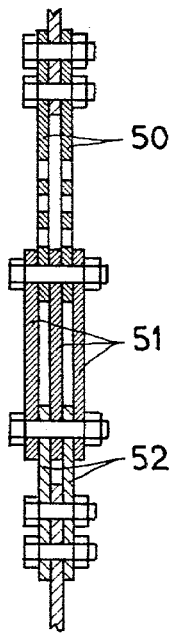

DEVICE FOR LIMITING STRESSES IN PARTICULAR FOR BURIED TUBULAR STRUCTURES

The present invention relates to a deformable device for limiting stresses in neighbouring elements of a structure, such as a metal channel or pipe, a gallery or well casing or like curved structure.

For the purpose of forming an underground passageway, it is known to employ pipes which are covered with filling earth or to maintain open, by casing or supporting element, wells or galleries formed under the surface of the natural ground.

Such structures are constructed by means of curved or bent sheet metal elements which are usually corrugated and fixed to each other by their edge portions, which constitute generatrices of the tubular structure, by assembling means such as screw-and-nut assemblies. An assembly of these elements thus forms a shell or sleeve and the complete structure is formed by a succession of these sleeves which are fixed to each other by their end portions.

It is known that, after they have been placed in position, these tubular structures are subjected to exterior pressures which are due in particular to the progressive disappearance of the tangential stresses which occurred in the ground in the vicinity of the gallery, and due to the decompression of the lateral earth resulting from the excavation of the passageway, to the weight of the filling on the pipe and to variable loads which they must support, for example due to the circulation of vehicles on the surface of the ground. These pressures or loads have a tendency to deform the cross-sectional shape of the structure.

It has already been proposed, for example in U.S. Pat. No. 3,318,099, to limit the stresses in the region of the connections between the bent elements making up the roof of the structure, this connection being achieved in such manner that, by a mutual sliding of the end portions of the elements, the stresses due to the loads are limited by frictional sliding between the elements as soon as the structure is put under load.

U.S. Pat. No. 4,018,054 discloses an improvement in this deformable frictional system by the use, in the region of the bolts assembling the bent elements, of a permanent deformation of metal when the elements slide relative to each other after the structure has been put under load. Thus there is provided at the end of one of the elements a circular aperture for the assembling bolts whereas at the corresponding ends of the other elements there is provided an aperture in the shape of a key-hole whose rectilinear portion is narrower than the diameter of the bolt. Upon the mutual sliding of the elements, the edges of this rectilinear portion are then spread apart by the bolt, which requires a certain force beyond which the sliding can occur.

Such a device for limiting stresses has several drawbacks.

Key-hole shaped apertures are not as easily made as simple circular apertures. In addition, the mutual sliding of the elements of the structure is limited to the length of the apertures, and the latter cannot be excessively large if a harmful weakening in the connection zone of the elements is to be avoided.

Moreover, an analysis of the load diagrams of such structures shows that the stresses are not evenly distributed along the periphery of the structure. It may therefore be desirable to limit the stresses to certain preferential regions of the periphery (in particular in the lateral zones). However, if it is desired to regulate the deformation according to the position on the periphery of the structure, the latter cannot be formed by identical elements. This of course results in a more expensive manufacture, since, instead of elements always having the same type of apertures, several types of elements must be provided. From the point of view of assembly on the site, this requires moreover a selection of the elements on the part of the personnel in charge of the work, which complicates the work and creates a risk of errors in the assembly.

An object of the invention is to provide a stress limiting device which may be employed with elements of practically any type and which overcomes the aforementioned drawbacks.

According to the invention, there is provided a device for limiting stresses exerted by the neighbouring earth on a buried structure comprising at least two elements which form at least one part of the wall of the structure, the structure defining a longitudinal axis with respect to which said device is adapted to extend in a parallel direction when it is mounted between two neighbouring elements of the structure along the periphery of the structure, said stress limiting device comprising at least one longitudinal slidable plate adapted to be rendered rigid by one of the edge portions thereof with one of the elements of the structure, at least two longitudinal guide elements adapted to be rendered rigid with the other elements of the structure and respectively applied by one of their faces against at least the opposite end portion of the slidable plate, and a plurality of fixing means which pass through apertures formed in the slidable plate and in said guide elements for the purpose of clamping said opposite edge portion of the slidable plate between the guide elements, at least one of the guide elements constituting a fishplate, at least the apertures in said opposite edge portion of the slidable plate being disposed in a plurality of spaced-apart longitudinal rows so that the zones located between the apertures of the same row or of two adjacent rows form zones of deformation and/or fracture which are capable of yielding under the fixing means by a sliding of said slidable plate between the guide elements under the effect of forces which may be exerted on the device by said elements of the structure.

When such a stress limiting device is mounted between two neighbouring elements of a buried structure, it can only transmit between these elements a selected maximum force beyond which its dimension along the periphery of the structure starts substantially to vary by a plastic deformation of the zone of deformation and/or fracture, which allows the structure to accommodate itself to its load and provides an upper limit of the stresses. During the reduction of the transverse dimension of the structure, each fixing means pertaining to a given row of the rows of apertures in the slidable plate may travel from one aperture to the following, subsequent to deformation and fracture of the zones between these apertures, until it reaches the last aperture of this row.

Owing to the features of the stress limiting device according to the invention, there is provided an independent unit the shape or form of which is not related to that of the elements of the structure which are subjected to stresses, except that the normal fixing means with which the latter are provided along their edge portion must enable them to be connected to the stress limiting device. In other words, it suffices that the elements of the structure be provided with simple fixing apertures alongside their edges to enable them to be connected to said device. Under these conditions, all the elements of the structure may be identical, it being possible to provide one or more stress limiting devices on its periphery between two neighbouring elements. Moreover, it will be observed that the stress limiting device is not space consuming and practically does not decrease the effective section of the passage through the structure.

Further features of the invention will be apparent from the ensuing description which is given solely by way of example with reference to the accompanying drawings in which:

FIGS. 7 to 12 are partial plan views of other embodiments of the device according to the invention, and FIG. 13 is a cross-sectional view of another modification of the invention.

FIG. 1 is a cross-sectional view of a stress limiting device according to the simplest embodiment of the invention.

Figure 6:
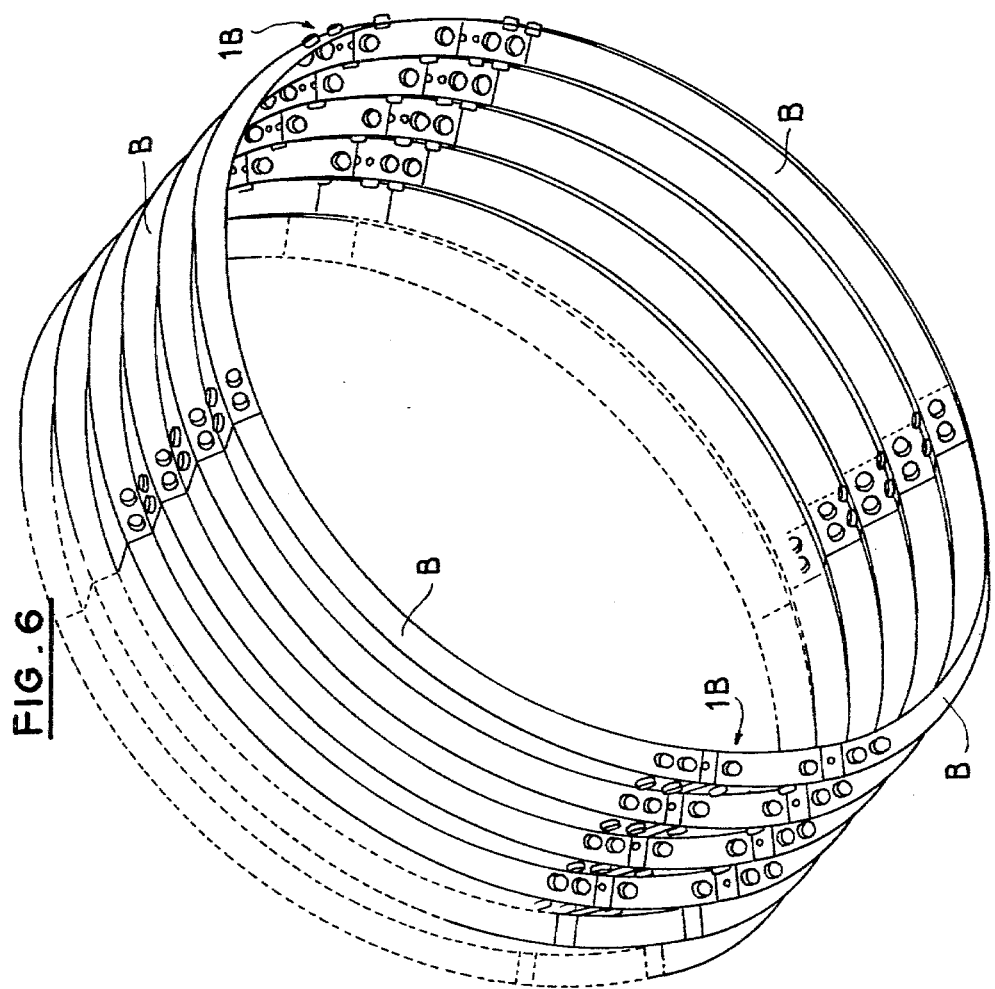
FIG. 6 is a partial perspective view of a pipe or other curved structure in which the stress limiting device shown in FIGS. 3 to 5 is employed.

Two elements A1 and A2 which, in the presently-described embodiment, consist of planar metal sheets, are subjected to forces which tend to cause the adjacent edges a1 and a2 of the sheets to move toward each other in the direction of the arrows. The aim of the invention is to limit the stresses by deformation and/or fracture of the material and also by friction and in this way avoid the overloading of the elements A1 and A2, for example so as to avoid their buckling or fracture.

A series of fixing apertures t is provided alongside the end edge a1 or a2 of each sheet A1 and A2.

The stress limiting device 1 according to the invention in fact constitutes a connecting device which interconnects the elements A1 and A2. It comprises a slidable plate 2 which extends along the edge a1 of the element A1 and is rendered rigid therewith owing to the provision of a series of apertures 3 alongside one of its edges, these apertures being disposed in a manner identical to that of the apertures t of this element A1. The plate 2 may therefore be easily fixed to the latter by assembling means 5 such as screws and nuts.

The plate 2 also has alongside its edge 6 opposed to the element A1 several rows of apertures 7, these rows extending longitudinally. In the illustrated embodiment, the spacing between two neighbouring rows of apertures 7 is the same, the zone 8 located between two apertures of the same row forming a region of the plate 2 of the reduced resistance or strength. The spacing between the rows is chosen in accordance with the stresses which may be exerted on the elements A1 and A2.

The stress limiting device also comprises a guide plate or fishplate 9 which is disposed against one of the large sides 10 of the plate 2 and provided alongside its longitudinal edges 11 and 12 with series of fixing apertures 13 and 14 respectively. The fixing apertures 13 are adapted to line up with the respective apertures of the rows of the slidable plate 2, it being understood that, in the presence of forces which are exerted on the elements A1 and A2 in the direction of the arrows and in the course of the mounting of the device between the elements A1 and A2, the apertures 13 are made to coincide with the apertures of the row which is the nearest to the corresponding longitudinal edge 6 of the plate 2.

The fixing apertures 14 provided in the fishplate 9 are adapted to line up with a series of apertures t of the element A2 for interconnecting them. Note that, in the embodiment of FIG. 1, the element A2 itself performs the function of the guide elements.

When forces are exerted on the elements A1 and A2, and on condition that these forces are sufficient, the assembling means 5 interconnecting the plate 2 and the guide plate 9 are capable of deforming and tearing the zone 8 between the first two rows of apertures so that they pass into the apertures of the second row. If the stresses continue at a sufficient magnitude, the zone between the apertures of the following row are also deformed and then torn and this may continue until the force produced by the stresses is less than the force required to cause the deformation or the tearing of these zones.

By suitably choosing the nature of the material of the plate 2, the spacing between the rows, the number of apertures 7 per unit length in each row and the thickness of the plate 2, it is possible to determine the limit value in respect of which the material of the plate 2 yields to the stresses applied to the elements A1 and A2. This limit value may be a safety value beyond which it may be considered, for example, that there would be a danger of buckling or fracture of the elements A1 and A2.

Figure 1:
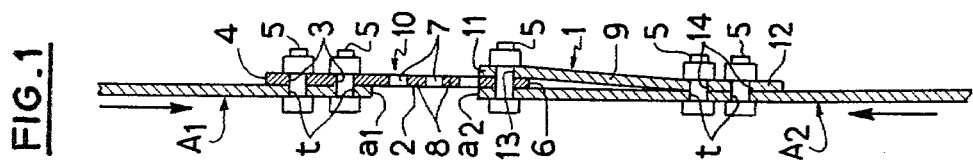
FIG. 1 is a cross-sectional view of a stress limiting device according to the invention in its most simplest form.

It will be observed that the stress limiting device according to the invention constitutes an independent unit which may be manufactured and assembled separately in the factory and has dimensions which are not related to those of the elements it unites. In the illustrated embodiment, the latter are for example elements of sheet metal, but it will be understood that the device according to the invention may be employed between two elements of any form provided that they have two longitudinal edge portions provided with fixing apertures as illustrated in FIG. 1. However, as concerns the type of means for fixing the device according to the invention to the elements subjected to the stresses, FIG. 1 merely shows an example, since any fixing means may be employed. To give a practical example, the thickness of the elements A1 and A2 and that of the plates 2 and 9, may be, for example, 5 mm and the material chosen may be, for example, sheet steel.

In the embodiment just described, the plate 9 cooperative with the corresponding zone of the element A2, guides the displacement of the slidable plate while it is applied closely against the corresponding faces of the latter. Consequently, in addition to the stress limiting effect created by the deformation and the tearing of the zone 8, there is a frictional effect resulting from the sliding of the elements against each other (plates 2 and 9 and element A2).

Figure 2:
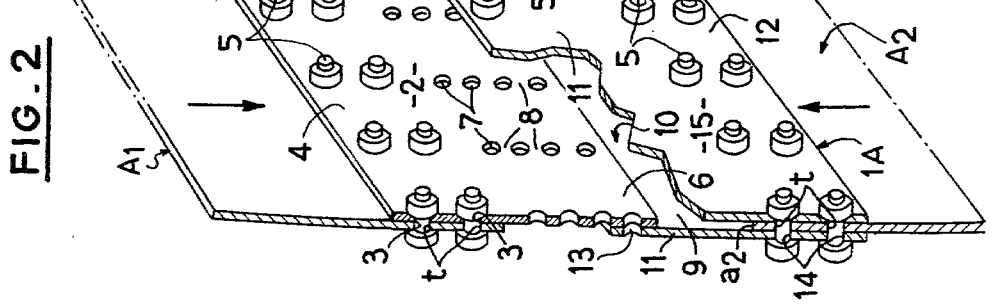
FIG. 2 is a partial perspective view of a device according to the invention which constitutes a second embodiment of the invention.

In the embodiment shown in FIG. 2, the stress limiting device A1 comprises, in addition to the guide plate 9 already described, a second guide plate or fishplate 15 which is identical and parallel to the firstmentioned plate, the element A2 of the structure being engaged between these two guide plates. The slidable plate 2 is identical to that already described with reference to FIG. 1.

FIGS. 3 to 6 show an application of the stress limiting device according to the invention in pipes, casings or other buried cylindrical structures.

Such a structure, a small section of which is shown in FIG. 6, comprises curved or bent elements B, in the presently-described embodiment four in number, formed by thin corrugated metal sheets the corrugations of which extend in a direction perpendicular to the generatrices of the elements. The illustrated pipe has a circular cross-sectional shape, but it will be understood that other cylindrical shapes may be contemplated, depending on the use to which they are put.

In the described embodiment, it is assumed that the pipe must withstand stresses which are due to the earth surrounding it and which produce compressive forces in its walls, in particular on each side of the horizontal diameter. Thus, the pipe comprises stress limiting devices 1B which are located in these regions and extend throughout the length of the pipe.

Figure 3:
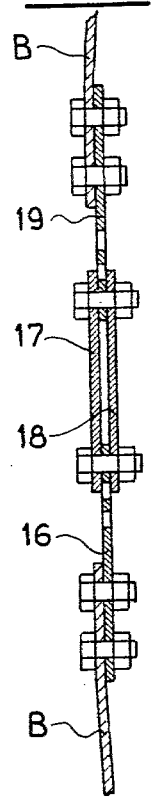
FIG. 3 is a cross-sectional view of a third embodiment of the device according to the invention.
Figure 4:
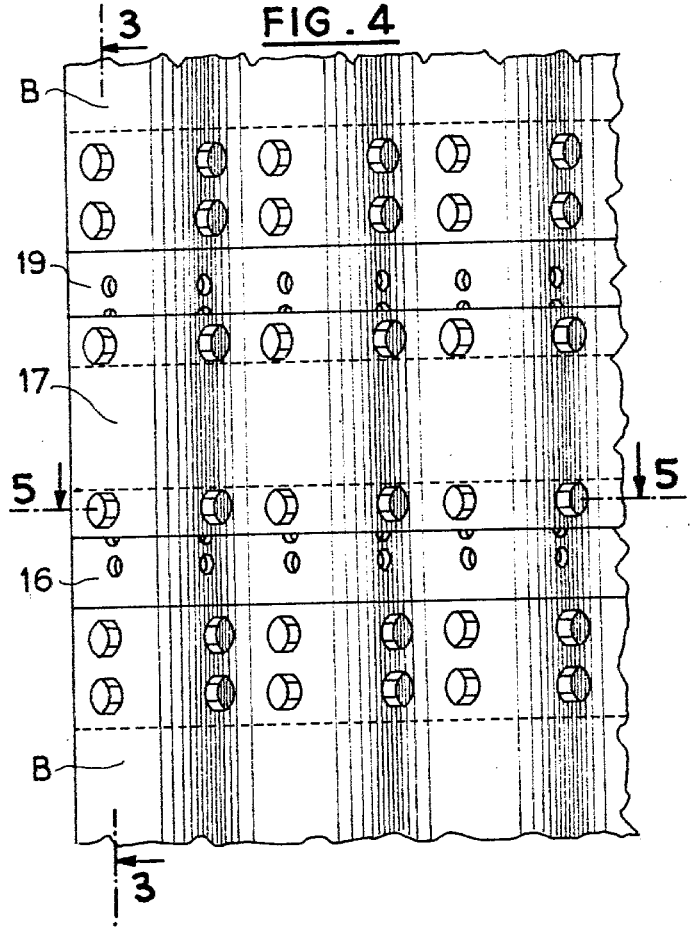
FIG. 4 is a partial side elevational view of the device of FIG. 3.
Figure 5:
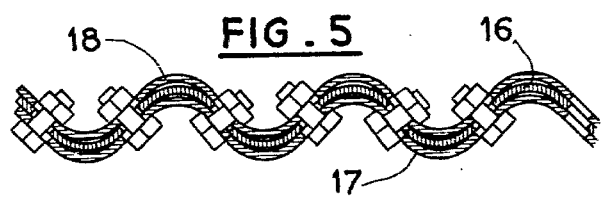
FIG. 5 is a sectional view taken on line 5—5 of FIG. 4.

As shown in the detail views to an enlarged scale in FIGS. 3 to 5, each stress limiting device 1B interconnecting two curved elements B comprises a first slidable plate 16 which, apart from the fact that it is corrugated to fit the corrugated sheet of the element B, is designed in the same way as the plates 2 of FIGS. 1 and 2. This first slidable plate is fixed to the corresponding lower curved element B. The device also comprises two guide plates 17 and 18 and a second slidable plate 19 which is identical to the first-mentioned plate but disposed in opposition thereto, since it is fixed to the upper curved element B.

In this arrangement of the stress limiting device, the effects of the deformation, fracture and friction of the two slidable plates 16 and 19 are added to each other for limiting the stresses.

FIG. 5 shows that all the apertures intended for the passage of the connecting means, shown as being screw-and-nut assemblies, are formed in the flanks of the corrugations of the various elements constituting the pipe, which permits obtaining an arrangement which facilitates the alignment of the apertures with each other when assembling. However, the apertures may be provided at the crests of the corrugations.

It will be observed that the pipe shown in FIG. 6 comprises for identical bent or curved elements whose position in the assembly is of no importance. This is due to the fact that the stress limiting device according to the invention constitutes a distinct unit. The manufacture of the curved elements is in this way simplified and, on the site, the assembly operations are simplified since they involve no choice on the part of the assembly personnel. Moreover, the stress limiting devices may be manufactured and assembled in the factory.

Whereas in the embodiment of the invention described with reference to FIGS. 1 to 6 the apertures 7 provided in the slidable plates are circular and of identical shape, FIGS. 7 to 12, which will now be described, show plates in which the shape of the apertures is adapted to obtain a certain regulation or dosing in the limitation of the stresses in cooperation with the frictional sliding effect between the plates.

FIG. 7 shows a slidable plate 20 which is mounted between two pairs of guide plates 21 and 22. Only one plate of each pair is visible in the drawing. It will be understood that each pair of plates 21 and 22 is connected to an element subjected to the stresses (not shown).

The slidable plate 20 has, near to its two opposed edge portions, alternating groups of apertures 23 and 24 arranged in a plurality of parallel longitudinal rows. The outer rows are formed by apertures 25 and 26 which are alternately circular and oblong and the other two rows have solely circular apertures 27.

With the diameter of all of the circular apertures equal to d, the length of the tearable zones 28 between the apertures preferably also has this value while the length of each oblong aperture 26 is equal to 1.5 d.

In this embodiment, the apertures 29 and 30 of the guide plate, respectively corresponding to the alternating rows 23 and 24 of the slidable plate 20, are respectively offset a distance e which is also equal to d in the presently-described embodiment.

When such an assembly is subjected to forces in the direction of the arrows, the zones 28 which first participate in the limitation of the stresses are those adjacent to the circular apertures 25, since the connecting means of the apertures 26 slide freely. When the means engaged in these oblong apertures finally reach the end edges of the latter, the connecting means corresponding to the apertures 25 have alreadly torn the zones 28 which were located in front of them so that they now reach the apertures of the following rows where they can slide freely. This procedure is repeated in an alternating manner for the respective groups 23 and 24. Of course, in practice, the destruction of the intermediate zones is not as distinct, since the material exhibits a certain amount of plasticity and deformation before fracture. However, the arrangement described permits obtaining a sufficient regularization and dosing of the stress limitation.

In FIG. 8, a modification of the stress limiting device of FIG. 7 is shown in which the slidable plate 31 has longidutinal rows of apertures forming alternating groups of apertures 32 and 33 which are aligned in a direction perpendicular to the edges of the plate.

The outer rows comprise alternately oblong and circular apertures whereas in each of the other rows the apertures are alternately offset by a distance 0.5 d, in which d is the diameter of the circular apertures. In this way, a given aperture of a row coincides in the adjacent group 32 or 33 with a deformable or tearable zone.

This arrangement has the advantage of not requiring an offsetting of the apertures provided in the guide plates 34 and 35 associated with this slidable plate 31.

FIG. 9 shows another modification in which each edge of a slidable plate 37, which cooperates with guide plates 36, has two groups 38a, 38b of longitudinal rows of apertures 38, each group of rows cooperating with a row of connecting means. Solely the apertures 39 of the outer rows are oblong, the apertures 40 and 41 of all the other rows being circular. With this arrangement, an operation identical to that of the modifications of FIGS. 7 and 8 is obtained.

FIG. 10 shows another embodiment of a stress limiting device which illustrates the fact that the force for tearing the slidable plate can be easily determined by choosing the dimension of the tearable zone 42 located between apertures of two adjacent rows. In the presently-described embodiment, the zone 42 is smaller than in the foregoing embodiments so that said force may be smaller.

FIG. 11 illustrates another manner of determining this tearing force. Here, the plate 43 has exclusively oblong holes 44 whose longitudinal dimension extends in a direction perpendicular to the direction of application of the forces.

FIG. 12 shows that the tearing force may be progressively decreased by providing a slidable plate 45 whose apertures must have, from row to another, a dimension which increases in a direction perpendicular to the direction of application of the forces. In other words, the aperture 46 in which the connecting means is introduced before application of the stresses is circular, whereas the following apertures 47, 48 and 49 have an oblong shape whose longitudinal dimension increases in this order. Of course, depending on the circumstances, the arrangement of these apertures may be reversed so as to obtain a tearing force which progressively increases, or, it is possible, in the presence of the longitudinal dimensions of the apertures, to change this force for example by increasing this dimension and then decreasing it, or vice versa.

FIG. 13 shows another embodiment of the invention which is in fact a double version of the device shown in FIG. 2. It can be seen that this device has two parallel slidable plates 50 and three guide plates 51 whose edge portions are sandwiched with those of the slidable plates 50. In this case, two auxiliary plates 52 are also provided to ensure an appropriate connection with an element of the structure.

Note that the stress limiting device according to the invention, whatever its embodiment, may be planar or curved in the direction of application of the forces. The latter case may be employed in pipes such as that shown in FIG. 6 by adapting the curvature of the connecting device to that of the pipe.

Further, the drawings show slidable and guide plates of uniform thicknesses. These thicknesses may be adapted to the forces involved and different thicknesses may be chosen for several of the plates making up the device according to the invention.

Having now described my invention what I claim as new and desire to secure by Letters Patent is:

1. A device for limiting stresses exerted by the ground on the wall of a buried structure, which structure comprises at least two elements which form at least a part of the wall of the structure, the structure defining a longitudinal axis and said device being adapted to extend in a direction parallel to said axis when it is mounted between the two elements of the structure which are neighbouring elements along the periphery of the structure, said stress limiting device comprising at least one longitudinal slidable plate having a first edge portion and a second edge portion opposed to the first edge portion, the first edge portion being adapted to be connected to one of said structure elements, at least two longitudinal guide elements adapted to be connected to the other element of said structure elements and applied respectively by one of their faces against at least the second edge portion of the slidable plate, apertures in the slidable plate and the guide elements and a plurality of fixing means extending through the apertures in the slidable plate and in said guide elements for clamping said second edge portion of the slidable plate between said guide elements, at least one of the guide elements constituting a fishplate, at least the apertures in said second edge portion of the slidable plate being disposed in a plurality of spaced-apart longitudinally extending rows so that zones located between the apertures of the same row of two adjacent rows form zones capable of yielding by deformation and/or fracture under the fixing means by a sliding of said slidable plate between said guide elements under the effect of forces which may be exerted on the device by said structure elements.

2. A device as claimed in claim 1, wherein the slidable plate is connected by said second edge portion to one of said structure elements, said one of said structure elements thus having a portion thereof which performs the function of one of said guide elements.

3. A device as claimed in claim 1, comprising at least two guide elements respectively applied against opposed faces of the slidable plate.

4. A device as claimed in claim 1, comprising two slidable plates which are respectively connected to said neighbouring structure elements and two guide elements which are respectively clamped against opposed faces of said slidable plates and interconnect the slidable plates.

5. A device as claimed in claim 1, wherein the device is corrugated in a direction which is perpendicular in the direction of application of said forces so that the edges of the slidable plate and guide elements have a corrugated shape.

6. A device as claimed in claim 5, wherein the corrugations have flanks and the apertures are formed in said flanks.

7. A device as claimed in any one of the claims 1 to 4, the device being curved in accordance with a curvature which corresponds to the direction of application of said forces.

8. A device as claimed in claim 1, wherein said slidable plate has a plurality of rows of apertures in each of its longitudinal edge portions, each of said edge portions being clamped between two fishplates.

9. A device as claimed in any one of the claims 1 to 4, wherein an outer row of apertures formed in at least one of the edge portions of said slidable plate has apertures which are alternately of oblong and circular shape, the apertures of all the other rows being circular, said connecting means being initially mounted in the apertures of said outer row so that, upon application of the stresses, the connecting means extending through the oblong apertures undergo a sliding without tearing the slidable plate, whereas the connecting means associated with the circular apertures of the outer row tear the zones of material to which they are immediately adjacent.

10. A device as claimed in claim 9, wherein the apertures in the edge portion of each guide element corresponding to the edge portion of the slidable plate are alternately offset a distance corresponding to the diameter of the circular apertures whereas the length of each oblong aperture of the slidable plate is equal to substantially 1.5 times said diameter.

11. A device as claimed in claim 9, wherein in a row other than the outer row or rows of the slidable plate the apertures are alternately offset a distance which corresponds to one half of the diameter of the circular apertures of said rows.

12. A device as claimed in any one of the claims 1 to 4, wherein at least one edge portion of the slidable plate comprises two groups of rows of apertures, the outer row comprising oblong apertures whereas all the other rows comprise circular apertures, each group of rows of apertures being associated with a series of connecting means so that, under the effect of said forces, the connecting means associated with the first group of rows undergo first a sliding without tearing the slidable plate, whereas the connecting means associated with the second group of rows first tear the zones of material which are immediately adjacent to the apertures of the first row of said second group.

13. A device as claimed in any one of the claims 1 to 4, wherein the apertures in the slidable plate have an oblong shape whose longitudinal dimension extends in a direction substantially perpendicular to the direction of application of the forces.

14. A device as claimed in any one of the claims 1 to 4, wherein the respective dimensions of the apertures varies from one row to another in a direction which is perpendicular to the direction of application of said forces.

* * * * *